US007945437B2

(12) United States Patent
Mount et al.

(10) Patent No.: US 7,945,437 B2
(45) Date of Patent: May 17, 2011

(54) SYSTEMS AND METHODS FOR USING AUTOMATED TRANSLATION AND OTHER STATISTICAL METHODS TO CONVERT A CLASSIFIER IN ONE LANGUAGE TO ANOTHER LANGUAGE

(75) Inventors: John Mount, San Francisco, CA (US); Amir Ashkenazi, Los Altos, CA (US); Daniel Klein, Alameda, CA (US); Teg Grenager, San Francisco, CA (US)

(73) Assignee: Shopping.com, Brisbane, CA (US)

( * ) Notice: Subject to any disclaimer, the term of this patent is extended or adjusted under 35 U.S.C. 154(b) by 1057 days.

(21) Appl. No.: 11/344,839

(22) Filed: Jan. 31, 2006

(65) Prior Publication Data
US 2007/0005337 A1    Jan. 4, 2007

Related U.S. Application Data

(60) Provisional application No. 60/649,800, filed on Feb. 3, 2005.

(51) Int. Cl.
*G06F 17/28* (2006.01)
(52) U.S. Cl. .................. 704/4; 704/277; 704/2
(58) Field of Classification Search ............... 704/1–2, 704/3, 4, 8–9, 5, 7, 10, 231, 245, 277
See application file for complete search history.

(56) References Cited

U.S. PATENT DOCUMENTS

| 5,751,957 A | 5/1998 | Hiroya et al. | |
| 6,507,829 B1 | 1/2003 | Richards et al. | |
| 6,963,831 B1 * | 11/2005 | Epstein | 704/9 |
| 7,363,212 B2 * | 4/2008 | Erhart et al. | 704/2 |
| 7,467,079 B2 * | 12/2008 | Morimoto et al. | 704/9 |
| 2001/0051868 A1 | 12/2001 | Witschel | |
| 2003/0083860 A1 | 5/2003 | Abir | |
| 2004/0254782 A1 | 12/2004 | Li | |

OTHER PUBLICATIONS

Rector et al." A comprehensive approach to developing and integrating multilingual classifications: GALEN's classification workbench". Presented at the AMIA 1998 Annual Symposium (AMIA'98). Lake Buena Vista, Florida,1998, p. 1115.*
Li et al. "Using Bilingual webdata to mine and rank translations", IEEE Intelligent Systems, 18(4), 2003, pp. 54-59.*
Park et al. "Large scale unstructured document classification using unlabeled data and syntactic information". In PAKDD 2003, LNCS vol. 2637, 2003, pp. 88-99.*
Bangalore et al. "Stochastic Finite-State Models for Spoken Language Machine Translation." Proc. Workshop on Embedded Machine Transla-tion Systems, 2000, pp. 52-59.*

(Continued)

*Primary Examiner* — Huyen X. Vo
(74) *Attorney, Agent, or Firm* — Haynes and Boone, LLP.

(57) ABSTRACT

Systems and methods for using automated translation and other statistical methods to convert a classifier in one language to another language are provided. In one embodiment of the invention, a method preferably includes marking target language examples of passages of text in order to obtain an initial classifier in the target language, re-classifying a plurality of target language examples in the initial classifier, and then questioning—i.e., determining the validity—of the marking used to obtain the initial classifier. Preferably, the questioning is based on the re-classifying. Then, preferably following the questioning, the method isolates a high-quality set of target examples based on the results of the questioning. Finally, the method uses the high-quality set of target examples to prepare a high-quality classifier in the target language.

24 Claims, 6 Drawing Sheets

OTHER PUBLICATIONS

Stuckenschmidt, et al., Semantic Translation Based on Approximate Re-classification. In Workshop on Semantic Approximation, Granularity and Vagueness, Colorado, 2000, pp. 1-9.

Bel et al., Cross-Lingual Text Categorization, European Conference on Digital Libraries Proceedings, Aug. 2003, pp. 126-139.

Tikk et al., Text Categorization on a Multi-lingual Corpus. Proc. of the 4th Int. Symp. of Hungarian Researchers on Computational Intelligence, Nov. 2003, pp. 1-11.

International Search Report and Written Opinion for PCT/US06/04103, mailed Feb. 19, 2008, 14 pages.

David Yarowsky "Unsupervised Word Sense Disambiguation Rivaling Supervised Methods" In Proceedings of the 33rd Annual Meeting of the Association for Computational Linguistics, pp. 189-196, Cambridge, MA, Jul. 7-12, 1995.

David Yarowsky et al. "Inducing Multilingual Text Analysis Tools via Robust Projection Across Aligned Corpora" In Proceedings of the Second Meeting of the North American Association for Computational Linguistics, pp. 200-207, Jun. 2-7, 2001.

N. Bel et al., "Cross-Lingual Text Categorization" European Conference on Digital Libraries Proceedings, pp. 126-139, Aug. 17-22, 2003, (including PowerPoint Presentation "Cross-Lingual Text Categorization" pp. 1-21).

J.J.G. Adeva et al., "Multilingual Approaches to Text Categorisation" The European Journal for the Informatics Professional, No. 3, pp. 43-51, vol. VI, Jun. 2005.

L. Rigutini et al., "An EM Based Training Algorithm for Cross-Language Text Categorization" IEEE/WIC/ACM International Conference on Web Intelligence (WI-05), Sep. 19-22, 2005.

* cited by examiner

SYSTEMS AND METHODS FOR USING AUTOMATED TRANSLATION AND OTHER STATISTICAL METHODS TO CONVERT A CLASSIFIER IN ONE LANGUAGE TO ANOTHER LANGUAGE

CROSS REFERENCE TO RELATED APPLICATION

This application claims priority from U.S. Provisional Patent Application No. 60/649,800, filed on Feb. 3, 2005.

BACKGROUND OF THE INVENTION

This patent application relates to the problems of classifying text. Classifying text may include, for example, deciding if the example text is describing a product for sale, deciding if text is describing a television monitor, deciding if text is spam or non-spam or placing text into a taxonomy—i.e., a classification system of members based on similarity of structure or origin.

Systems and/or methods that can classify free text are often called classifiers. While very valuable, these systems and/or methods are typically expensive to construct and maintain. Such systems and methods may include constructions of large-rule bases (sets of detailed rules for structuring data), human expert systems and machine-learning systems. The expense of these systems often comes from deigning the rules and/or supplying sufficient data for the machine-learning system.

Machine-learning is the field that studies methods of producing classifiers directly from marked example data. That is, for a given classification task (such as deciding what type of product this text is and describing or extracting the weight of the product from the product description) machine-learning can produce from a series of marked examples a working program that reliably performs the task. Marked examples may include pairs of information where the first half of the pair is the information that is available for the classification task (typically features such as the free-text, price and other easily extracted data) and the second half of the pair is the desired outcome (assignment of the example to a category or the desired extracted data-field). Typically production and maintenance (either making software edits by hand or editing with software tools) is the most expensive step in machine learning.

It would be preferable to take advantage of the effort used to produce and/or maintain such a classifier in one language (for example English) to produce a similar system in another language (for example French).

SUMMARY OF THE INVENTION

It is an object of the invention to take advantage of the effort used to produce and/or maintain a classifier in one language by converting the already-extant and maintained classifier in one language into a classifier in a different language. It should be noted that any updating of a classifier in one language may substantially continuously be used to update a classifier in a second language according to the invention.

Systems and methods for using automated translation and other statistical methods to convert a classifier in one language to another language are provided. In one embodiment of the invention, a method preferably includes marking target language examples of passages of text in order to obtain an initial classifier in the target language, re-classifying a plurality of target language examples in the initial classifier, and then questioning—i.e., determining the validity of—the marking used to obtain the initial classifier. Preferably, the questioning is based on the re-classifying. Then, preferably following the questioning, the method isolates a relatively higher-quality set of target examples based on the results of the questioning. Finally, the method uses the high-quality set of target examples to prepare a high-quality classifier in the target language.

While systems and methods according to the invention acknowledge that target examples that have relatively high quality are more likely correct (and, therefore, safer to rely on) they also preferably take into account that knowledge of which examples are relatively low quality is important as well. It is important to know which examples exhibit low quality because these examples are better candidates for sending for re-scoring. This process may be referred to as active learning. Thus, the procedure for scoring the examples has a two-fold purpose—i.e., determining which examples are relatively high quality and determining which examples are relatively low quality.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
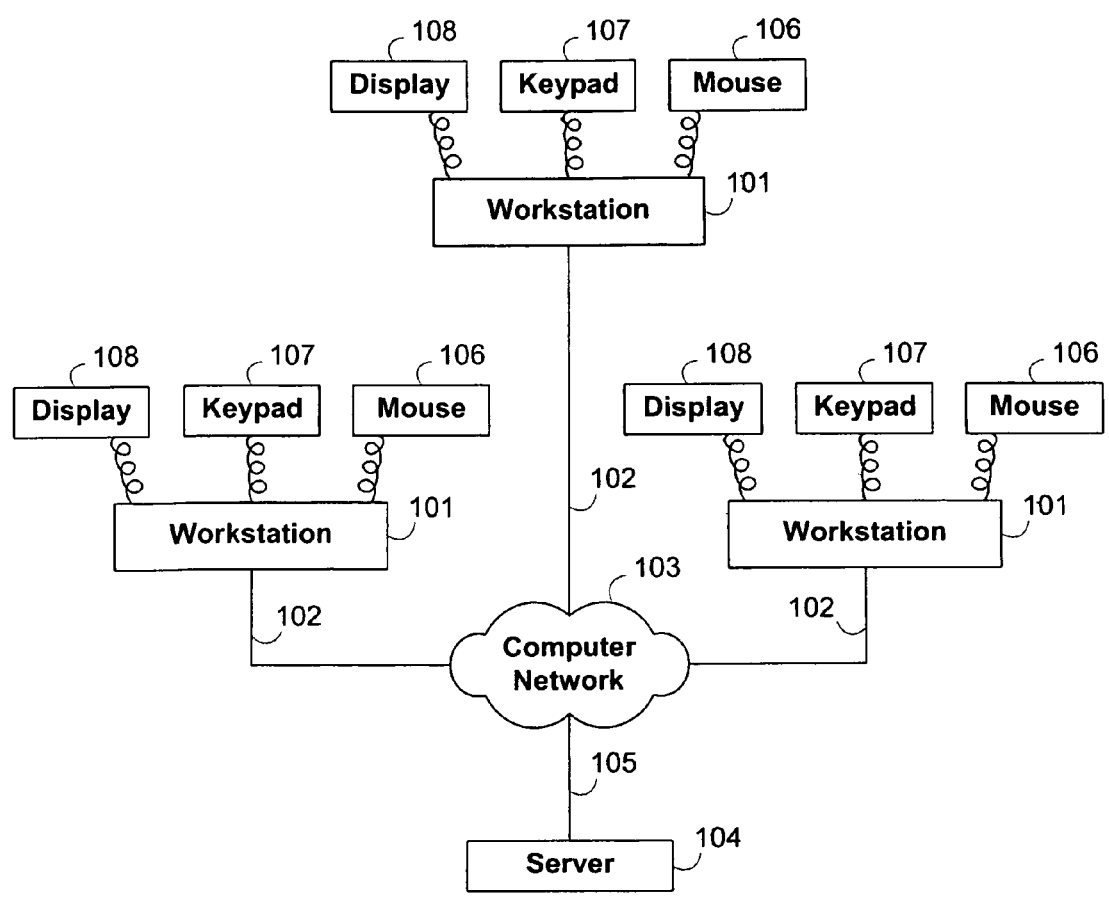
FIG. 1 is an illustration of an electronic implementation of a software system according to the present invention.

Glossary:

Classify: The act of deciding which of a number of possible categories an example belongs to. A common application of classification is the assignment of an example to a category from an ontology or tree of categories. The classification is also called a "mark."

Classifier: A computer program or machine-readable medium that includes a set of decision-making procedures for classifying a passage of text or other computer-readable item. An example is deciding if a passage of text is referring to a television, computer or washing-machine. A classifier is often implemented as a running program that can actually perform the decision procedure on data.

Features: The data used by the classifier to make a decision. Typically features are constructed from text by operations such as creating a list of words and ordered pairs of words in the text (called unigrams and bigrams). Often words are normalized by a process called "stemming" where words like "dog" and "dogs" are considered to represent the same feature (presence of the word dog).

Feature Model: A scheme for converting text into features. Can be as simple as the "bag of words model" which is just the set of words found in the text. Often contains higher-order features such as bigrams (ordered pairs of words found in the example text).

Machine-learning: Any method of converting a population of marked examples (see definition of "marked example" below) into a classifier. Popular methods include (but are not limited to):

Bayesian Models
Boosting
Clustering
Graphical Models
Latent Indexing
Linear Programming
Logistic Regression
Majority Voting
Naive Bayes
Nearest Neighbor
Perceptron
Principle Component Analysis
Regression
Support Vector Machines
Winnow
Unsupervised Learning Marked Example: An information pair where the first half of the pair is data or features (typically free-text, prices and other easily extracted information) and the second half is the desired classification result for this data—i.e., the designated category or classification of the text.

Marks: synonym for classification outcome. An un-marked example differs from a marked one in that it does not have a mark.

Un-marked Example: Data or features (typically free-text, prices and other easily extracted information) to be presented for classification. Same as a marked example without the mark.

Systems and methods according to the invention preferably use a machine-learning based classification system in one language to produce a similar system in a second language (or even multiple languages).

The general concept of the invention relates to using automated translation and other statistical methods to convert a classifier in one language to a classifier in another language.

The following example illustrates systems and methods according to the invention.

For purposes of this application, the language that includes a classifier is referred to herein as the host language. The classifier includes a large set of marked examples. The language in which systems and methods according to the invention build the new classifier is referred to herein as the "target language." It is assumed that the host language includes a set of marked examples and a machine-learning technique that, based on the marked examples, produces a functioning classifier applicable to unmarked examples in the host language. It is further assumed that a set of un-marked examples exists in the target language.

One tool according to the invention for converting the classifier from one language to another is a statistical feature translator. This is a tool that takes an input example [in one language] and builds an approximation of an example or set of examples in another language. Alternative implementations of that tool include machine translation (such as Systran), human translation, and dictionary-based word-for-word translation. An advantage of the system according to the invention is that it does not require a faithful translation of the complete text but rather a translation of the features associated with the text. Thus, a good approximation of the set of features may be extracted from a translated text. Another benefit of such a system is that it does not require a single translation, but can accept a series of translations (with or without weights—i.e., the quality of the selection with respect to the words that include multiple possible translations—or other suitable quality indications) from any source (or multiple sources).

For example if a feature model is the so-called "bag of words model" (where the features are just the un-ordered set of words found in the text) a simple word-for-word dictionary translation is often sufficient to successfully translate host examples to target examples. Also such a system can handle ambiguity where a word in the host language could have one of many incompatible meanings in the target language. The system may translate the feature into a limited selection of possible target meanings (instead of having to pick one meaning and choose it as the translation). In this example the text of a description is converted to a set of word-features in the host language which can then be translated (either word by word or using wider context) into a weighted set of words in the target language.

In some embodiments of the invention, one tool that may be used to accomplish translation of features is a statistical feature translator. The statistical feature translator is a tool that may be run both from text in the host language to create approximate samples in the target language and from text in the target language to create approximate examples in the host language. However, most of the procedures can be carried out if only one direction of translation is available. It should also be noted that an implementation that works directly from examples to examples (instead of using the original text for context) is easy and effective in this system.

In many applications (Internet or "On-line" shopping being one of them), a so-called trivial translator—i.e., which copies unaltered features from the host language into the target language or back—performs well enough to be used in a system. Essentially the only correct points of translation in the trivial translator are words that have the same spelling and meaning in both languages—e.g., certain product names in an On-line shopping application. Furthermore, phoneme or grapheme-based translators, which provide translation rules, are usable in this application as they can often provide translations that can be used. It is one of the major features of a system according to the invention that such weak, mechanical and low-accuracy translation systems can be useful as follows.

Three techniques according to the invention exist to convert the ability to classify in the host language into the ability to classify in the target language: the basic method, the forward technique and the backward technique.

The Basic Method:

The Basic Method includes a number of variations. One is that any un-marked example—e.g., text of a product or service being offered for sale—in the target language is back-translated into the host language and the host language classifier is used to perform the classification. A target language classifier may also be built by forward translating all of the host language marked examples into the target language and using machine learning training techniques to build a new classifier in the target language using this data. It should be noted that if the classifier's data representation is at all similar to the structures used to encode examples (which it often is) then instead of translating all the examples from the host language into the target language and training a new classifier one can directly translate the classifier's data-structures to get a target-language classifier.

The Basic Method is usable for simpler classification problems and is used in the construction of the other techniques, as described below in more detail.

The Forward Technique:

This technique attempts to reliably move the classifier from the host language into the target language in a small number of significant steps as follows. The goal is to eliminate later dependence on the translator—i.e., build a stand-alone target language classifier—and, thereby, increase classifier quality.

Any of the variations of the Basic Method may be used to assign marks to the un-marked target language examples and get an initial effective classifier that accepts examples from the target language.

After the initial target language classifier is obtained, it may then be "self improved" according to the invention by a self-training or boot-strapping procedure. First, the initial target language classifier is used to re-classify all of the training data in the target language.

In response to the re-classification, some of the original translated examples may be questioned. Examples are called suspect if any of the following conditions hold.

1) Diagnostic code (which may be obtained using the original basic classifier or the improved target language classifier) reports relatively low-quality in the classification.

2) The classifications from the original basic classifier or the improved target language classifier disagree with each other or with known truth.

This scoring step, and the results obtained therefrom (as described above) allow the system to isolate a number of different training examples:

1) Safe examples. These are examples where the classification given by an improved target classifier agrees with known truth or the classification assigned by the basic method (if known truth is not available).

2) High value examples. These are examples where the classification given by the improved target classifier disagrees with known truth or the classification by the basic method (if known truth is not available).

High risk examples. These are examples where the classification given by the improved target disagrees with a low quality classification by the basic method and there is no available known truth.

Any set of safe examples, high value examples or safe and high value examples may be referred to herein as a set of quality examples.

Additionally, for original un-marked examples in the target language the system checks if the new target language classifier agrees with the host language classifier when the examples are back-translated. Also, for original marked examples in the host language the system checks that the forward-translated example is classified the same by the target language classifier as the original marked example in host language. The critical observation is that if a set of quality examples is selected using the above criteria and then used to train a new target language classifier, the new target language may be, and often is, of higher quality than the initial target language classifier.

One advantage of this embodiment of the invention is that the training the new target language classifier can optionally be limited to examples that are natively in the target language (having received their marking from a combination of back-translation into the host language and from the initial target classifier). Thus the system trains only on examples described in a native utterance (and no longer on any inaccurate translations).

The Backward Technique:

The next alternative technique according to the invention is to substantially always classify in the host language but adapt the host language classifier to better deal with the output of the back-translation from the target language. The point is the best classifier for the actual host language might not be the best classifier for examples translated from the target language into the host language as the host classifier would not be aware of or able to adapt to any of the properties of the translation scheme.

In this scheme marks are assigned to all of the target examples either by back-translating them into the host language and applying the original host language classifier or by using the Forward Technique to build a target language classifier and using it to classify in the target language. Either way it is assumed that the end product is a set of marked examples in the host language that have been translated from the target language. The point is that these examples may have different properties than examples produced natively in the host language. Then, the same quality-increasing techniques as described above in respect to the forward technique can be used to pick a subset of these back-translated examples that are determined to be of higher quality. Finally, a new classifier may be built in the host language using only the high-quality examples translated from the target language.

This classifier may then be used to classify back-translations of target language examples in the host language. Since the classifier was in fact trained on exactly this sort of data it should be more reliable than using a native host language classifier on back-translated examples. In machine learning it is considered vitally important that classifiers be trained on data that has the same distributional properties as data upon which it will be used. The Backward Technique has this property.

Variations:

In the foregoing, two languages were used as host and target. In actuality, this technique can be repeated for multiple languages and even used to share data among languages. Also because raw translations are not part of the outside observable output, aggressive normalization, such as stemming, can be used. In fact, using this method, one can go to a 3 or 4 language solution by adding a pseudo-host language and/or a pseudo-target language.

The pseudo languages can either be abstract language representations (such as Systran internal parse trees) or close to the actual languages.

Examples of pseudo languages could include:

pseudo-English1: English but all words stemmed to lose notions of singular or plural, possessive etc.

pseudo-English2: Phonetic or phonetic code transcription of words. This language could be very useful for tracking adopted proper nouns and brand-names into languages dissimilar to English (such as Asian languages).

pseudo-German: German but all gender removed, verbs collected into single pieces and compound terms broken up.

The idea is that mechanical procedures are supplied to translate all host language data into the pseudo-host language and all target language data into the pseudo-target language. Then all the above training steps are performed over these pseudo-languages. It is not required to translate out of the pseudo languages into the originals. Particular advantages of the pseudo-languages is they can allow easier translation by moving down to a lowest common denominator representation (lose all gender, singular or plural, temporal, possessive, form of address distinctions) and they provide the ability to add phonetic information in parallel to text. This further allows one to track adopted words and proper names more accurately.

Referring to FIG. 1, classifier conversion system 100 for implementing the present invention is shown. As illustrated, system 100 may include one or more workstations 101. Workstations 101 may be local or remote, and are connected by one or more communications links 102 to computer network 103 that is linked via communications links 105 to server 104.

In system 100, server 104 may be any suitable server, processor, computer, or data processing device, or combination of the same. Server 104 may form part of the search results updating system. Furthermore, server 104 may also contain the search results updating system and merely transmit a Graphical User Interface or other display screens to the user at user workstation 101.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 102 may be used to implement the electronic search results updating system according to the invention.

Figure 2:
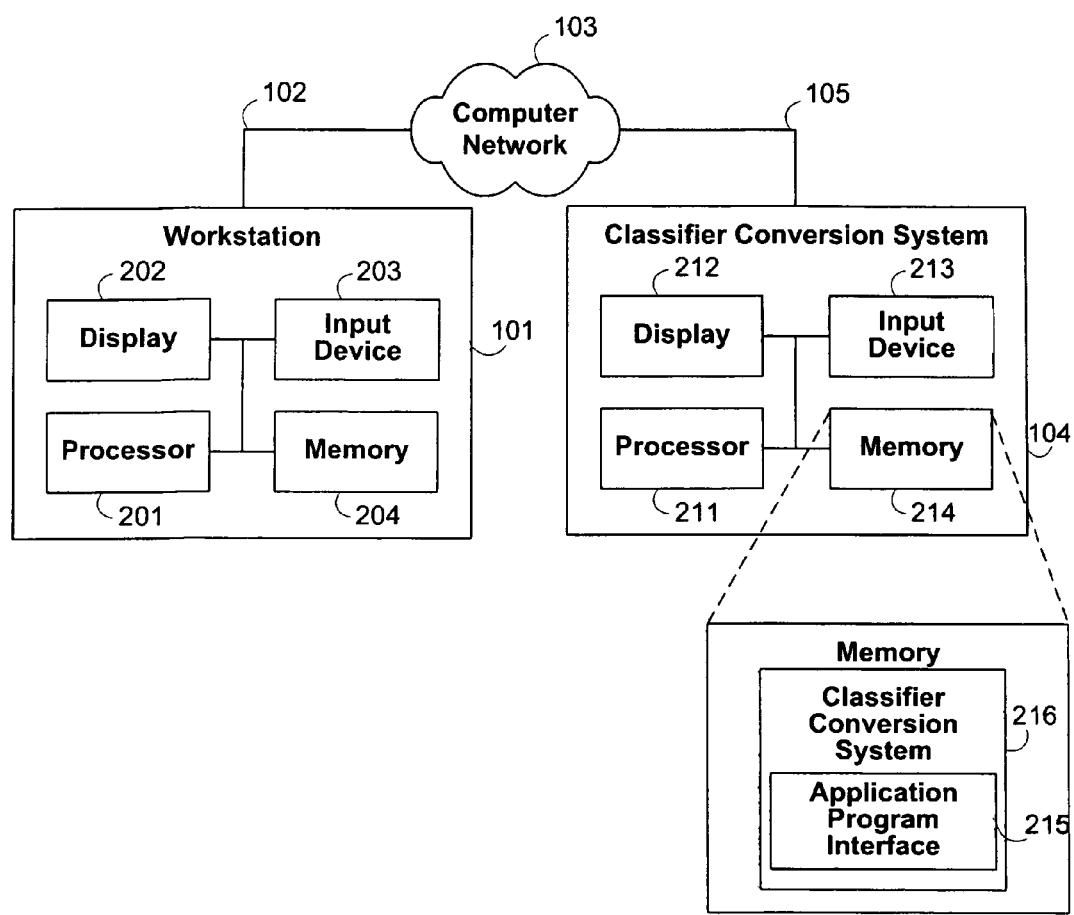
FIG. 2 is a block diagram of a workstation and a server that may be used to implement the processes and functions of certain embodiments of the present invention.

The server and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. Memory 204 also preferably contains a classifier conversion application 216 according to the invention.

Classifier conversion application 216 may preferably include application program interface 215, or alternatively, as described above (and as shown in FIG. 2), classifier conversion application 216 may be resident in the memory 214 of server 104. The only distribution to the user may be a Graphical User Interface which allows the user to interact with classifier conversion application 216 resident at server 104.

Processor 201 uses the workstation program to present on display 202 information relating to different products, merchant websites or other classifier conditions received through communication link 102 and commands, queries and navigational instructions or other suitable information transmitted by a user of workstation 101. Furthermore, input device 203 may be used to manually enter commands, queries and navigational instructions in order for these commands, queries and navigational instructions to guide the user through the classifier conversion system.

Figure 3:
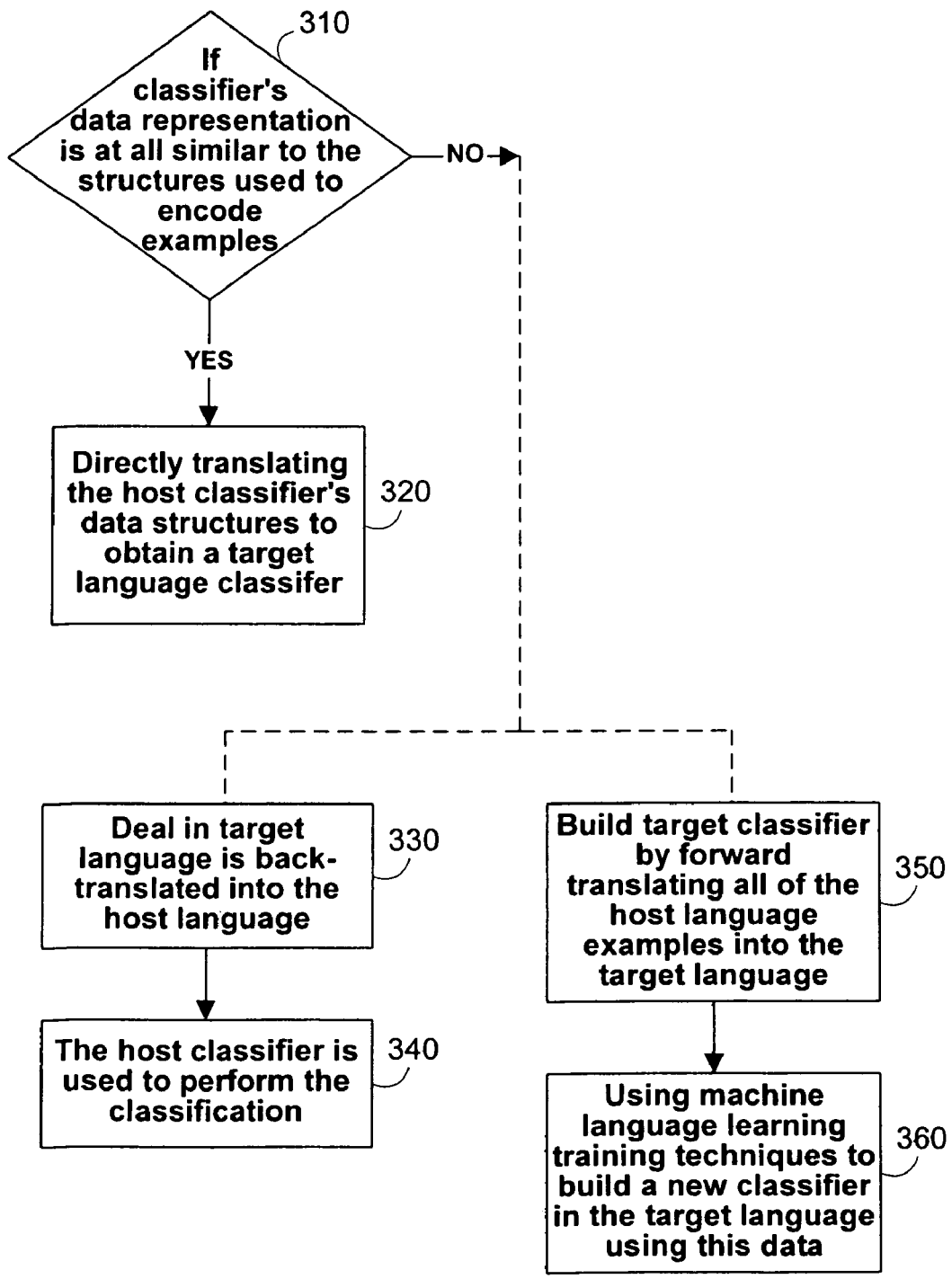
FIG. 3 is a group of flow charts depicting various embodiments according to the invention.

FIG. 3 shows multiple embodiments of methods according to the invention which primarily reflect the basic method described above. A first step of analysis is to determine in step 310 whether a classifier's data representation is at all similar to the structure used to encode examples in the target language. If the answer to the query is yes, then step 320 teaches directly translating the host classifier's data structures to obtain a target-language classifier. If the answer is no, then two paths are possible.

A first path is shown by steps 330 and 340. Step 330 shows that an example (which may refer to a passage of text referring or other computer-readable item relating to some aspect of an item being offered for sale) in a target language is back-translated into the host language. Step 340 shows that the host classifier is then used to perform the classification of the example.

An alternative embodiment, which may be described as the second path if the answer to query 310 is no, of the basic method of the invention is shown in steps 350 and 360. Step 350 shows building a target classifier by forward translating substantially all of the host language examples into the target language. Step 360 shows using machine-language learning training techniques to build a new classifier in the target language using the data obtained in step 350.

Figure 4:
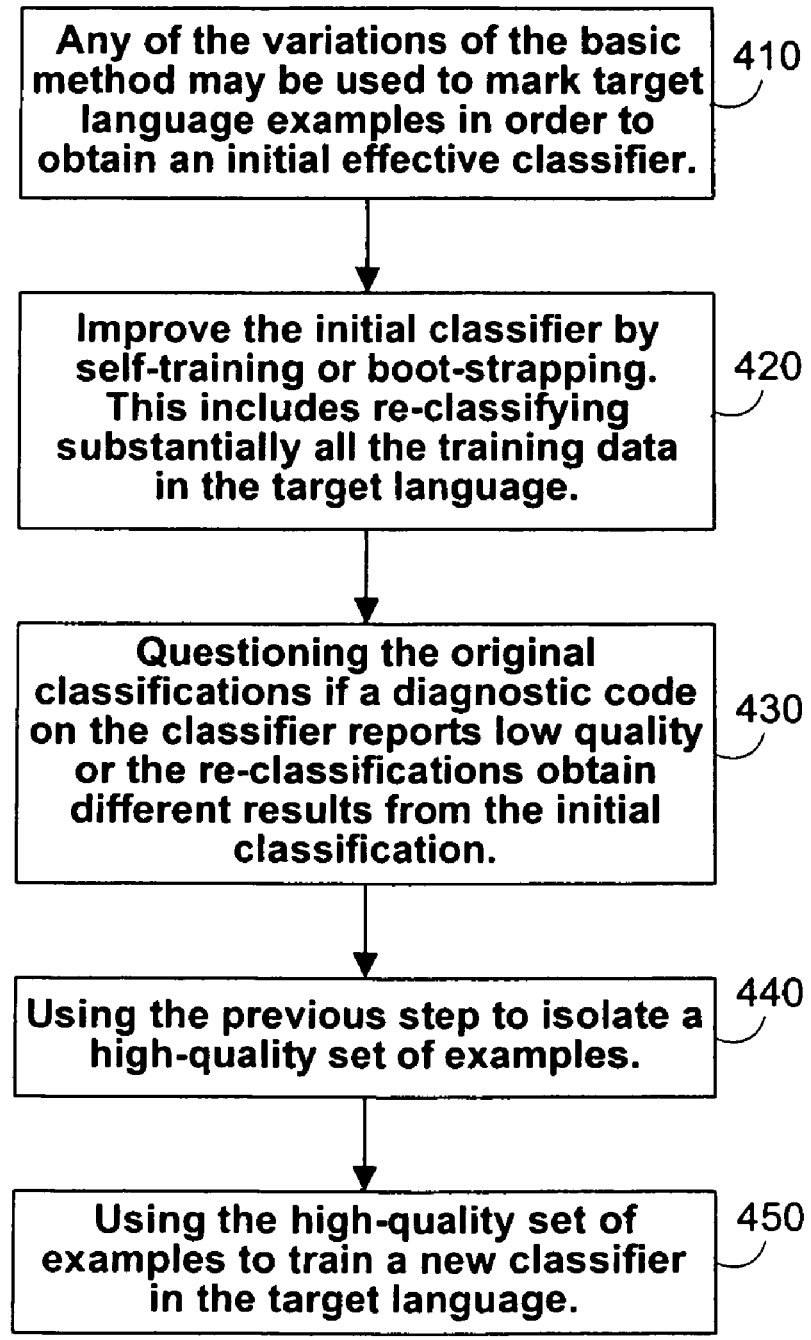
FIG. 4 is a flow diagram of another method according to the invention.

FIG. 4 shows an embodiment of the forward-technique for converting a classifier to a different language described above. Step 410 shows using any of the variations of the previously-described basic method (see FIG. 3 and corresponding text) may be used to mark target language examples in order to obtain an initial effective classifier.

Step 420 shows improving the initial classifier by self-training or boot-strapping. This includes re-classifying substantially all the training data in the target language.

Step 430 shows questioning the original classifications to determine if either a diagnostic code on the classifier reports low quality or the re-classifications obtain different results from the initial classifications.

Step 440 shows using the results obtained by step 430 to isolate a high-quality set of examples. Finally, Step 450 shows using the high-quality set of examples to train a new classifier in the target language.

Figure 5:
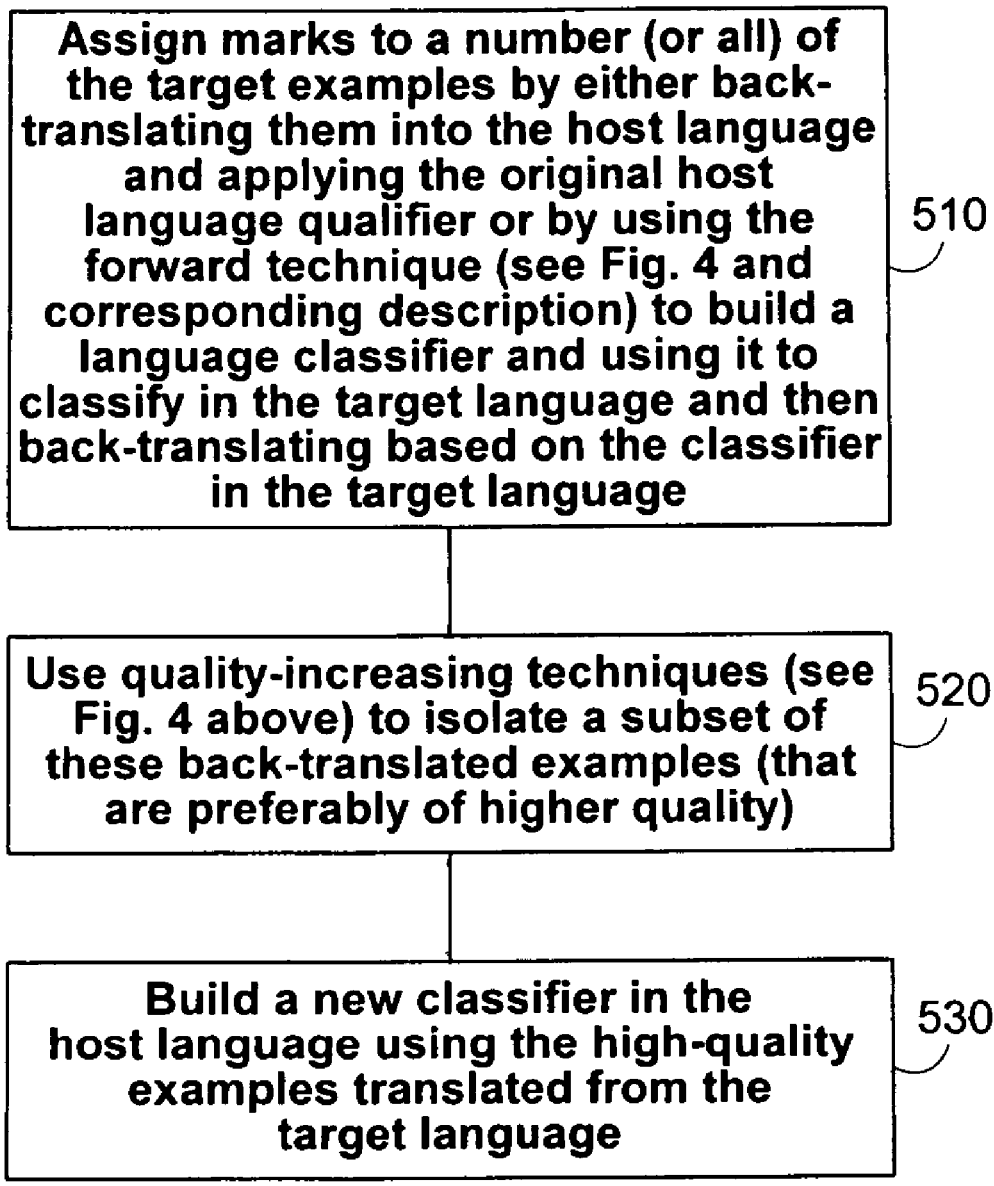
FIG. 5 is a flow diagram of yet another method according to the invention.
Figure 6:
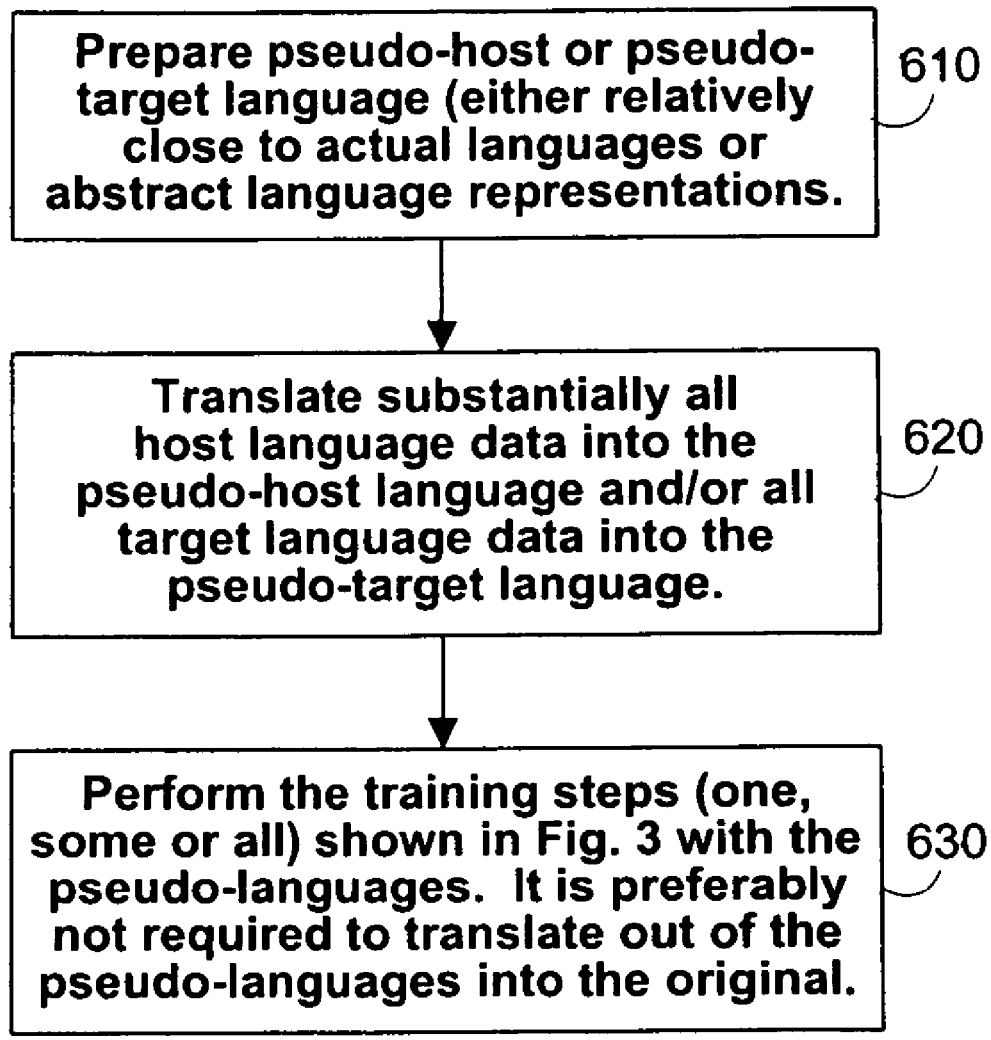
FIG. 6 is a flow diagram of still another method according to the invention.

FIG. 5 shows one embodiment of the backward technique according to the invention. Step 510 shows assigning marks to a number (or all) of the target examples by either back-translating them into the host language and applying the original host language qualifier or by using the forward technique to build a language classifier and using it to classify in the target language and then back-translating based on the classifier in the target language.

Step 520 shows using quality-increasing techniques to isolate a subset of these back-translated examples (that are preferably of higher quality).

Finally, step 530 shows building a new classifier in host-language using the high-quality examples translated from the target language.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A computer-readable non-transitory storage medium containing a classifier conversion application that, when executed, causes a computer to perform a method that converts an extant host language classifier on the computer to an initial target language classifier, the method comprising:
   translating marked host language examples included in the extant host language classifier on the computer to obtain translated marked target language examples, each example being an informational pair of a feature or features of the respective language and a classification result for that feature or feature;

building an initial target language classifier using the translated marked target language examples;
marking un-marked target language examples from passages of target language text using the initial target language classifier in order to obtain marked target language examples;
re-classifying the marked target language examples in the initial target language classifier;
questioning the marking used to obtain the marked target language examples in the initial target language classifier based on the re-classifying;
isolating a high-quality set of marked target language examples based on the results of the questioning; and
using the high-quality set of marked target examples to improve the initial target language classifier.

2. The computer-readable storage medium of claim 1, wherein the un-marked target language examples from the passage of target language text include free-text and prices to be presented for classification.

3. The computer-readable storage medium of claim 1, wherein machine language learning is used to build the initial target language classifier using the translated marked target language examples.

4. The method of computer-readable storage medium claim 1, wherein the method further comprises:
translating host language classifier data structures to obtain translated target language data structures; and
using the translated target language data structures to build the initial target language classifier.

5. A system that converts an extant host language classifier on the computer to an initial target language classifier, the system comprising:
memory containing a classifier conversion application; and
a processor for executing the classifier conversion application causing the system to:
translate marked host language examples included in the extant host language classifier on the computer to obtain translated marked target language examples, each example being an informational pair of a feature or features of the respective language and a classification result for that feature or feature;
build an initial target language classifier using the translated marked target language examples;
mark un-marked target language examples ef from passages of target language text using the initial target language classifier in order to obtain marked target language examples;
re-classify the marked target language examples in the initial target language classifier;
question the marking used to obtain the marked target language examples in the initial target language classifier based on the re-classifying;
isolate a high-quality set of marked target language examples based on the results of the questioning; and
use the high-quality set of marked target examples to improve the initial target language classifier.

6. The system of claim 5, wherein the un-marked target language examples from the passages of target language text include free-text and prices to be presented for classification.

7. The system of claim 5, wherein machine language learning is used to build the initial target language classifier using the translated marked target language examples.

8. The system of claim 5, wherein the processor causes the system to:
translating host language classifier data structures to obtain translated target language data structures; and
using the translated target language data structures to build the initial target language classifier.

9. A computer-readable non-transitory storage medium containing a classifier conversion application that, when executed, causes a computer to perform a method that converts an extant host language classifier on the computer to an initial target language classifier, the method comprising:
translating un-marked target language examples from passages of target language text into un-marked host language examples, each example being an informational pair of a feature or features of the respective language and a classification result for that feature or feature;
classifying the un-marked host language examples using the extant host language classifier on the computer based on marked host language examples included in the extant host language classifier;
marking un-marked target language examples from the passages of target language text based on the classifying to obtain marked target language examples;
building an initial target language classifier using the marked target language examples;
re-classifying the marked target language examples in the initial target language classifier;
questioning the marking used to obtain the marked target language examples in the initial target language classifier based on the re-classifying;
isolating a high-quality set of marked target language examples based on the results of the questioning; and
using the high-quality set of marked target language examples to improve the initial target language classifier.

10. The computer-readable storage medium of claim 9, wherein the un-marked target language examples from the passage of target language text include free-text and prices to be presented for classification.

11. The computer-readable storage medium of claim 9, wherein machine language learning is used to build the initial target language classifier using the marked target language examples.

12. The computer-readable storage medium of claim 9, wherein the method further comprises:
translating host language classifier data structures to obtain translated target language data structures; and
using the translated target language data structures to build the initial target language classifier.

13. A system that converts an extant host language classifier on the computer to an initial target language classifier, the system comprising:
memory containing a classifier conversion application; and
a processor for executing the classifier conversion application causing the system to:
translate un-marked target language examples from passages of target language text into un-marked host language examples, each example being an informational pair of a feature or features of the respective language and a classification result for that feature or feature;
classify the un-marked host language examples using the extant host language classifier on the computer based on marked host language examples included in the extant host language classifier;
mark un-marked target language examples from the passages of target language text based on the classifying to obtain marked target language examples;
build an initial target language classifier using the marked target language examples;

re-classify the marked target language examples in the initial target language classifier;
question the marking used to obtain the marked target language examples in the initial target language classifier based on the re-classifying;
isolate a high-quality set of marked target language examples based on the results of the questioning; and
use the high-quality set of marked target language examples to improve the initial target language classifier.

14. The system of claim 13, wherein the un-marked target language examples from the passages of target language text include free-text and prices to be presented for classification.

15. The system of claim 13, wherein machine language learning is used to build the initial target language classifier using the marked target language examples.

16. The system of claim 13, wherein the processor causes the system to:
translating host language classifier data structures to obtain translated target language data structures; and
using the translated target language data structures to build the initial target language classifier.

17. A computer-readable non-transitory storage medium containing a classifier conversion application that, when executed, causes a computer to perform a method that converts an extant host language classifier on the computer to a new host language classifier for classifying back-translations of target language examples in a host language, the method comprising:
translating un-marked target language examples from passages of target language text into un-marked host language examples, each example being an informational pair of a feature or features of the respective language and a classification result for that feature or feature;
classifying the un-marked host language examples using the extant host language classifier on the computer based on marked host language examples included in the extant host language classifier;
marking the un-marked target language examples from the passages of the target language text based on the classifying to obtain marked target language examples;
back-translating the marked target language examples into the host language in order to obtain back-translated marked host language examples;
re-classifying the back-translated marked host language examples in the extant host language classifier;
questioning the marking used to obtain the marked target language examples in the extant host language classifier based on the re-classifying;
isolating a high-quality set of back-translated marked host language examples based on the results of the questioning; and
using the high-quality set of back-translated marked host language examples to build a new host language classifier for classifying back-translations of target language examples in the host language.

18. The computer-readable storage medium of claim 17, wherein the un-marked target language examples from the passage of target language text include free-text and prices to be presented for classification.

19. The computer-readable storage medium of claim 17, wherein machine language learning is used to build the new host language classifier using the high-quality set of back-translated marked host language examples.

20. The computer-readable storage medium of claim 17, wherein the method further comprises:
translating host language classifier data structures to obtain translated target language data structures; and
using the translated target language data structures to mark the un-marked target language examples.

21. A system that converts an extant host language classifier on the computer to a new host language classifier for classifying back-translations of target language examples in a host language, the system comprising:
memory containing a classifier conversion application; and
a processor for executing the classifier conversion application causing the system to:
translate un-marked target language examples from passages of target language text into un-marked host language examples, each example being an informational pair of a feature or features of the respective language and a classification result for that feature or feature;
classify the un-marked host language examples using the extant host language classifier on the computer based on marked host language examples included in the extant host language classifier;
mark the un-marked target language examples from the passages of the target language text based on the classifying to obtain marked target language examples;
back-translate the marked target language examples into the host language in order to obtain back-translated marked host language examples;
re-classify the back-translated marked host language examples in the extant host language classifier;
question the marking used to obtain the marked target language examples in the extant host language classifier based on the re-classifying;
isolate a high-quality set of back-translated marked host language examples based on the results of the questioning; and
use the high-quality set of back-translated marked host language examples to build a new host language classifier for classifying back-translations of target language examples in the host language.

22. The system of claim 21, wherein the un-marked target language examples from the passages of target language text include free-text and prices to be presented for classification.

23. The system of claim 21, wherein machine language learning is used to build the new host language classifier using the high-quality set of back-translated marked host language examples.

24. The system of claim 21, wherein the processor causes the system to:
translating host language classifier data structures to obtain translated target language data structures; and
using the translated target language data structures to mark the un-marked target language classifier.

* * * * *